(12) United States Patent
Pires Fortes Ferreira et al.

(10) Patent No.: US 11,046,835 B2
(45) Date of Patent: Jun. 29, 2021

(54) INTELLIGENT POLYMER COMPOSITIONS

(71) Applicants: Braskem S.A., Camaçari (BR); Universidade Federal do Rio Grande do Sul, Porto Alegre (BR)

(72) Inventors: Márcia Pires Fortes Ferreira, São Paulo (BR); Leonardo Batista Ito, São Paulo (BR); Luciane França De Oliveira, São Paulo (BR); João Henrique Zimnoch dos Santos, Porto Alegre (BR); Viviane Dalmoro, Porto Alegre (BR)

(73) Assignees: Braskem S.A., Camaçari (BR); Universidade Federal do Rio Grande do Sul, Porto Alegre (BR)

( * ) Notice: Subject to any disclaimer, the term of this patent is extended or adjusted under 35 U.S.C. 154(b) by 476 days.

(21) Appl. No.: 15/702,124

(22) Filed: Sep. 12, 2017

(65) Prior Publication Data

US 2018/0072872 A1     Mar. 15, 2018

Related U.S. Application Data

(60) Provisional application No. 62/393,352, filed on Sep. 12, 2016.

(51) Int. Cl.

| | |
|---|---|
| *C08K 9/10* | (2006.01) |
| *C08K 9/06* | (2006.01) |
| *C08K 5/00* | (2006.01) |
| *G01N 21/78* | (2006.01) |
| *C08L 23/08* | (2006.01) |
| *C08K 3/36* | (2006.01) |
| *C08K 5/29* | (2006.01) |
| *C08K 5/42* | (2006.01) |
| *C08L 23/06* | (2006.01) |
| *G01N 31/22* | (2006.01) |

(52) U.S. Cl.
CPC .............. *C08K 9/10* (2013.01); *C08K 3/36* (2013.01); *C08K 5/0041* (2013.01); *C08K 5/29* (2013.01); *C08K 5/42* (2013.01); *C08K 9/06* (2013.01); *C08L 23/06* (2013.01); *C08L 23/0815* (2013.01); *G01N 21/78* (2013.01); *G01N 31/22* (2013.01)

(58) Field of Classification Search
CPC .......... C08K 3/36; C08K 5/0041; C08K 5/29; C08K 9/06; C08K 9/10; C08L 23/0815; G01N 21/78; G01N 31/22
See application file for complete search history.

(56) References Cited

U.S. PATENT DOCUMENTS

| | | | |
|---|---|---|---|
| 9,063,111 B2 | 6/2015 | Acevedo et al. | |
| 9,746,380 B2 * | 8/2017 | Ribi | ............ A47G 21/00 |

FOREIGN PATENT DOCUMENTS

| | | | | |
|---|---|---|---|---|
| EP | 0932040 A1 * | 7/1999 | ........... | G01N 31/221 |
| EP | 2310318 A2 | 4/2011 | | |
| EP | 2617764 A1 | 7/2013 | | |
| WO | 2010016034 A2 | 2/2010 | | |

OTHER PUBLICATIONS

Machine translation of EP 0932040 (Year: 1999).*

* cited by examiner

*Primary Examiner* — Edward J Cain
(74) *Attorney, Agent, or Firm* — Osha Bergman Watanabe & Burton LLP (57) ABSTRACT

Polymeric compositions may include one or more adjunct polymers selected from a group of an ionomer and a polar polymer; and an intelligent additive, wherein when exposed to the external stimuli, the intelligent additive triggers a color change in the polymeric composition. Polymer compositions may include a nonpolar matrix polymer; one or more adjuncts selected from the group of an ionomer, a polar polymer, a metal salt, or combinations thereof. Polymer compositions may also include an intelligent additive, wherein when exposed to the external stimuli, the intelligent additive triggers a color change in the polymeric composition, wherein after at least 17 hours of exposure to the external stimuli, the polymer composition exhibits a ΔE of at least 8 or more, maintaining the ΔE of at least 8 or more for at least 5 days after the exposure to external stimulus is ceased.

28 Claims, 5 Drawing Sheets

INTELLIGENT POLYMER COMPOSITIONS

BACKGROUND

The growing search for intelligent polymer materials with the ability to respond to changes in the environment and visually communicate the chemical status surrounding the polymer has driven the development of new technologies, particularly in food packaging technologies. In the last decades, many studies have been developed aiming for the production of intelligent packaging to ensure food safety, quality and traceability. The packaging industries search for objective systems and aim to guarantee quality and safety of the food, in addition to ensuring consumer confidence. In general, the systems used are accessories incorporated or fixed in the packages, such as labels, adhesives and sensors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to polymeric compositions that include one or more adjunct polymers selected from a group of an ionomer and a polar polymer; and an intelligent additive including an indicator sensitive to an external stimulus, wherein when exposed to the external stimuli, the intelligent additive triggers a color change in the polymeric composition.

In another aspect, embodiments disclosed herein relate to polymer compositions that include a nonpolar matrix polymer; one or more adjuncts selected from the group of an ionomer, a polar polymer, a metal salt, or combinations thereof; and an intelligent additive including an indicator sensitive to an external stimulus, wherein when exposed to the external stimuli, the intelligent additive triggers a color change in the polymer composition.

In another aspect, embodiments disclosed herein relate to polymer compositions including: at least one polymer; and an intelligent additive including an indicator sensitive to an external stimuli, wherein when exposed to the external stimuli, the intelligent additive triggers a color change in the polymeric composition, wherein after at least 17 hours of exposure to the external stimuli, the polymer composition exhibits a $\Delta E$ of at least 8 or more, maintaining the $\Delta E$ of at least 8 or more for at least 5 days after the exposure to external stimulus is ceased.

In another aspect, embodiments disclosed herein relate to polymer compositions including: at least one matrix polyolefin; one or more adjunct polymers; at least one metal salt; and an intelligent additive including an indicator sensitive to an external stimulus, wherein when exposed to the external stimuli, the intelligent additive triggers a color change in the polymeric composition, wherein after at least 17 hours of exposure to the external stimuli, the polymer composition exhibits a $\Delta E$ of at least 8 or more, maintaining the $\Delta E$ of at least 8 or more for at least 5 days after the exposure to external stimulus is ceased.

Other aspects and advantages of the claimed subject matter will be apparent from the following description and the appended claims.

DETAILED DESCRIPTION

In one aspect, embodiments disclosed herein relate to intelligent polymer compositions that exhibit visual changes, such as color change, in response to changes in the environment surrounding the polymer. In some embodiments, intelligent polymer compositions may include an indicator that changes in response to a stimulus such as changes in pH, humidity, the passage of time, or the presence of organic volatiles or oxygen. In some aspects, embodiments of the present disclosure are directed to intelligent polymer compositions that may be formulated into "intelligent" food packaging and storage containers that provide a color indicator of food quality by monitoring various chemical changes by spoilage microorganisms.

Intelligent polymer compositions in accordance with the present disclosure may include an indicator that is embedded in a polymer matrix along with one or more adjuncts. In addition to the indicator, various adjuncts such as metal salts and/or adjunct polymers may be added that may impart various physical and chemical properties on the polymer, including, for example, tuning the sensitivity of the indicator by controlling the diffusion rate of external stimuli specific to the indicator into the polymer matrix, while also controlling diffusion of the indicator out of the polymer matrix and into the surrounding environment.

In one or more embodiments, intelligent polymer compositions may be formulated as a polymer stock for constructing various polymer articles. In some embodiments, intelligent polymer compositions may contain one or more adjunct polymers that are polar polymers and at least one indicator, and optionally one or more of a metal salt, ionomer, and a matrix polymer. In polar polymer-based formulations, the polar polymer may be present in an amount varying from 5 to 50% by weight of the total composition, or from 10 to 20% by weight; the indicator may be present in an amount varying from 0.1 to 15% by weight, or from 0.5 to 5% by weight; the metal salt, if present, may be present in an amount varying from 0.2 to 35% by weight, or from 1 to 12% by weight; and the matrix polymer, if present, may be present in an amount varying from 0 to 94.7%, or 63% to 88.5% by weight.

In one or more embodiments, intelligent polymer compositions may be an ionomer-based formulation containing one or more adjunct polymers that are ionomers and at least one indicator, and optionally one or more of a polar polymer and a matrix polymer. In ionomer-based formulations, the ionomer may be present in an amount varying from 7 to 85% by weight of the total composition, or from 11 to 32% by weight; the indicator may be present in an amount varying from 0.1 to 15% by weight, or from 0.5 to 5% by weight; and the matrix polymer, if present, may be present in an amount varying from 0 to 92.9%, or 63% to 88.5% by weight.

In one or more embodiments, intelligent polymer compositions may be formulated as a concentrated "masterbatch" composition that is combined with other polymers and/or adjuncts prior to use as a feedstock to generate a polymer composition tailored to a specific end use. In some embodiments, intelligent polymer compositions may be a polar polymer-based masterbatch formulation containing one or more adjunct polymers that are polar polymers and at least one indicator, and optionally a metal salt. In polar polymer-based masterbatch formulations, the polar polymer may be present in an amount varying from 25 to 70% by weight of the total composition; the indicator may be present in an amount varying from 20 to 65% by weight; and the metal salt, if present, may be present in an amount varying from 10 to 35% by weight.

In one or more embodiments, intelligent polymer compositions may be an ionomer-based masterbatch formulation containing one or more adjunct polymers that are ionomers and at least one indicator, and optionally a metal salt. In ionomer-based masterbatch formulations, the ionomer may be present in an amount varying from 35 to 80% by weight of the total composition; the indicator may be present in an amount varying from 20 to 65% by weight.

Intelligent polymer compositions in accordance with the present disclosure may include an indicator encapsulated by in an encapsulant matrix some embodiments. Encapsulation of an indicator may extend the useful life of intelligent polymer compositions in some applications, for example, by maintaining the concentration and brightness/apparent intensity of a color indicator. Indicators are often small molecules or molecular complexes, which may diffuse through pores created in a polymer network. By encapsulating an indicator in an encapsulant matrix such as a silica matrix, diffusion of the indicator out of the polymer media may be controlled, while permitting the diffusion of a corresponding chemical stimuli or trigger into the polymer. The encapsulant matrix also prevents that degradation of indicators that are not resistant to the polymer processing conditions such as temperature and shear stress during processing techniques such as extrusion.

Color Change Quantification

Intelligent polymer compositions in accordance with the present disclosure incorporate one or more indicators that respond to a predetermined reactive stimulus that initiates a color change in the polymer material that may be observable by eye and/or ultraviolet-visible spectrophotometer. While particular systems are described below with respect to the quantification of color change of intelligent polymer compositions, it is envisioned that any system capable of registering the change in color of an indicator or polymer composition containing an indicator may be used.

In one or more embodiments, the total color difference (TCD) exhibited by an indicator may be quantified by a TCD index such as a CieLAB color change index ($\Delta E$) that uses L*, a*, b* values to describe the color of the polymer. $\Delta E$ is the difference in the color of the polymer before and after the contact with the external stimuli, and may be calculated in some embodiments according to Eq. (1) as described in Francis, F. J. 1983, Colorimetry of food, Peleg M. and Bagley E. B. (Eds.). Physical Properties of Foods, p. 105-123. Westport: AVI Publishing.

$$\Delta E=[(\Delta L^*)^2+(\Delta a^*)^2+(\Delta b^*)^2]^{1/2} \quad (1)$$

In Eq. (1), L* refers to luminosity and a* and b*, are the chromatic coordinates. The parameter a, varies from green (negative values) to red (positive values). The parameter b, varies from blue (negative values) to yellow (positive values). Francis (1983) reported that TCD more than 5.0 could be easily detected by unaided eyes and TCD more than 12 presented a clearly different shade of color. The determination of $\Delta E$ values are known throughout the literature, and measurement systems such as the CieLAB color system are commercially available.

In one or more embodiments, intelligent polymer compositions in accordance with the present disclosure may exhibit a color change that is detectable by eye after at least 17 hours of exposure to the external stimuli, which corresponds to a $\Delta E$ of at least 8 or more. In some embodiments, intelligent polymer compositions in accordance with the present disclosure may exhibit a color change corresponding to a $\Delta E$ of at least 8 or more after at least 17 hours of exposure to the external stimuli, in which the $\Delta E$ of at least 8 or more is maintained for at least 5 days after the exposure to external stimuli is ceased.

In some embodiments, intelligent polymer compositions may exhibit a color change $\Delta E$ of at least 12 or more after at least 17 hours of exposure to the external stimuli, and maintain a $\Delta E$ of at least 12 or more for at least 5 days after the exposure to external stimulus is ceased. In some embodiments, intelligent polymer compositions may exhibit a color change $\Delta E$ of at least 12 or more after at least 17 hours of exposure to the external stimuli, and maintain a $\Delta E$ of at least 12 or more for at least 25 days after the exposure to external stimulus is ceased. In some embodiments, intelligent polymer compositions may exhibit a color change $\Delta E$ of at least 12 or more after at least 17 hours of exposure to the external stimuli, and maintain a $\Delta E$ of at least 12 or more for at least 33 days after the exposure to external stimulus is ceased.

Matrix Polymer

Intelligent polymer compositions in accordance with the present disclosure may contain a matrix polymer that imparts structural and chemical properties suitable for the intended application. Matrix polymers may be nonpolar in some embodiments and exhibit negligible polar character.

Matrix polymers may include polymers generated from olefin monomers, and may also include copolymers containing one or more additional comonomers. Examples of polyolefins include polyethylenes such as polyethylene homopolymers, polyethylene copolymers containing one or more olefin comonomers, copolymers of ethylene and one or more C3-C20 alpha-olefins, high density polyethylene, medium density polyethylene, low density polyethylene, linear low density polyethylene, very low density polyethylene, ultra low density polyethylene, ultrahigh molecular weight polyethylene and polypropylenes such as polypropylene homopolymer, polypropylene copolymers containing one or more olefin comonomers, copolymers of propylene and ethylene or one or more C4-C20 alpha-olefins, heterophasic polypropylene, random polypropylene. Olefin comonomers used to produce polyolefin compositions in accordance with the present disclosure may include branched and linear C2-C20 alkene monomers including ethylene, propylene, butylene, and the like. Polypropylenes in accordance with the present disclosure may be atactic or may have a stereoregularity that is isotactic or syndiotactic.

In one or more embodiments, the polyolefin compositions may include a copolymer prepared from a combination of monomers, and may be random or block copolymers. In one or more embodiments, the polyolefin compositions may include polymers generated from petroleum based monomers and/or biobased monomers. Commercial examples of biobased polyolefins are the "I'm Green"™ line of biopolyethylenes from Braskem S. A. In some embodiments, matrix polymers may also include thermoplastics such as polystyrene, copolymers of styrene and an olefin, such as SEBS or SEPS, polyvinyl acetate, polycarbonate, polyethylene terephthalate, polyacrylate, and the like.

Intelligent polymer compositions may contain a matrix polymer at a percent by weight (wt %) that ranges from amount varying from a lower limit selected from one of 0, 15, and 63 wt %, to an upper limit selected from one of 88.5, 92.9, 94.7, and 99.8 wt %, where any lower limit may be paired with any upper limit.

Intelligent polymer compositions in accordance with the present disclosure include matrix polymers and copolymers having a number average molecular weight of from about 10 kDa to about 2,000 kDa in some embodiments, and 30 kDa to about 400 kDa.

Adjuncts

Intelligent polymer compositions may include one or more adjuncts that modify chemical and/or physical properties of the final polymer formulation. In one or more embodiments, adjuncts may include adjuncts such as metal salts and polymers such as polar polymers and ionomers.

Metal salts in accordance with the present disclosure may include any inorganic or organic salt whose metal is selected from metals with valence +1, +2 or +3 being preferably selected from the group include Al, Zn, Ca, Mg, Na, Li. More preferably, the metal salt of the present disclosure is a metal salt of saturated or unsaturated organic acid with a carbon number of C1 to C50. In a particular embodiment, the metal salt may be an alkali or alkaline salt of stearate.

Intelligent polymer compositions may contain one or more metal salts at a percent by weight (wt %) that ranges from amount varying from a lower limit selected from one of 0.01, 0.2, 1, and 10 wt %, to an upper limit selected from one of 15, 12, and 35 wt %, where any lower limit may be paired with any upper limit. However, more or less may be added depending on the particular application.

In one or more embodiments, intelligent polymer compositions may include one or more adjunct polymers that are combined with the matrix polymer and indicator or formulated with a suitable indicator as an intelligent polymer composition or masterbatch composition.

Polar polymers in accordance with the present disclosure include polymers that include at least one functional group selected from the group consisting of hydroxyl, carboxylic acid and its salts, ester, ether, acetate, amide, amine, epoxy, imide, and halides, and combinations thereof. In some embodiments, polar polymers may include modified polymers such as polyvinyl chloride (PVC), ethylene vinyl acetate copolymer (EVA), polyethylene terephthalate (PET), polyethylene grafted with maleic anhydride (PE-g-MA), polypropylene grafted with maleic anhydride (PP-g-MA) polyethylene grafted with itaconic acid or its derivatives (PE-g-It), and mixtures thereof. For the purposes of the present disclosure, petroleum based or biobased polar polymers may be used, such as biobased ethylene vinyl-acetate, wherein at least one of the ethylene or vinyl acetate monomers are derived from biobased feedstocks, such as ethylene derived from sugarcane-derived ethanol.

Intelligent polymer compositions may contain a polar polymer at a percent by weight (wt %) that ranges from amount varying from a lower limit selected from one of 5, 10, 25, or 55 wt %, to an upper limit selected from one of 20, 50, 70, or 99.99 wt %, where any lower limit may be paired with any upper limit. However, more or less polar polymer may be added depending on the particular application.

Ionomers in accordance with the present disclosure include polymers prepared from at least one olefin monomer, at least one carboxylic acid monomer, and at least one or more cations of transition metals, alkali metals, or alkaline metals, including, in particular Na, K, and Zn. In some embodiments, transition metals or alkaline earth metals are used to neutralize acidic groups on the backbone of the ionomer. Olefin monomers used to prepare ionomers in accordance with the present disclosure include ethylene and C3-C20 alpha-olefins. Carboxylic acid monomers may include acrylic acid or methacrylic acid and the metal is selected from the group include sodium, potassium or zinc. In particular embodiments, ionomers may include ethylene/acrylic acid copolymer and/or ethylene/methacrylic acid copolymer, which may be at least partially neutralized by one or more alkali metal, transition metal, or alkaline earth metal cations.

Intelligent polymer compositions may contain an ionomer at a percent by weight (wt %) that ranges from amount varying from a lower limit selected from one of 7, 11, 35, or 55 wt %, to an upper limit selected from one of 32, 80, 85, or 99.99 wt %, where any lower limit may be paired with any upper limit. However, more or less indicator may be added depending on the particular application.

Indicator

Intelligent compositions in accordance with the present disclosure may include one or more indicators that are sensitive to external stimuli such as changes in pH, temperature, humidity, time, presence of organic volatiles and oxygen. When subjected to the appropriate stimuli, the indicator may exhibit visual changes, for example a color change, indicating that a change of a predetermined magnitude has occurred.

In one or more embodiments, indicators may be one or more selected from methyl violet, crystal violet, ethyl violet, malachite green, 2-((p-(dimethylamino) phenyl) azo) pyridine, quinaldine red, para-methyl red, litmus, metanil yellow, 4-phenylazodiphenylamine, thymol blue, m-cresol purple, tropaeolin 00, 4-o-tolylazo-o-toluidine, erythrosine sodium salt, benzopurpurin 4b, n,n-dimethyl-p-(m-tolylazo) aniline, 2,4-dinitrophenol, methyl yellow (n, n-dimethyl-p-phenylazoaniline), 4,4'-bis(2-amino-1-naphthylazo)2,2'-stilbenedisulfonic acid, potassium salt of tetrabromophenolphthalein ethyl ester, bromophenol blue, congo red, methyl orange, methyl orange xylene cyanol solution, ethyl orange, 2-((p-(dimethylamino)phenyl)azo)pyridine, 4-(p-ethoxyphenylazo)-m-phenylenediamine, monohydrochloride, methyl red, lacmoid, bromocresol purple, bromothymol blue, phenol red, metacresol purple, thymol blue, phenolphthalein, thymolphthalein, alizarin yellow r, carmine of indigo, 2,5-dinitrophenol, bromocresol green, chlorophenol red, bromophenol red, neutral red, rosolic acid, cresol red, o-cresolphthalein, tropaeolin o, 4-nitrophenol, anthocyanins, ferroin, n-phenylanthranilic acid, resazurin, fast green, yellow twilight, bright blue, bordeaux, tartasin, red 40, erythrosine, anthocyanin, curcumin, cochineal carmine, saffron, azorubine, capsanthin, carmine hydro, indigotine, pinachrome, ponseau 4R, Resorcinmalein, rodol green, riboflavin, beet red, heptamethoxy red, hexametoxy red, propyl red, beta carotene, benzopyridine, mixture of cholesteryl oleyl carbonate, cholesteryl nonanoate, and cholesteryl benzoate, spironolactone, fluorans, spiropyrans, fulgides photochromic cyclic acid anhydrides of dialkylidenesuccinic acid, bisphenol A, parabens, 1,2,3-triazole derivates, 4-hydroxycoumarin, ferroin, methylene blue, N-phenanthranilic acid, resazurin, iron (II) complex 5-nitro-1,10-phenanthroline, 2,3-diphenylaminadicarboxylic acid, iron (II) complex 1,10-phenanthroline, iron (II) complex 5-methyl 1,10-phenanthroline, elioglacaine A, sulfonic acid diphenylamine, diphenylamine, p-ethoxychrysoidine, indigotetrasulfonate, phenosafranin, 2,2'-bipyridine (Ru complex), nitrophenantraline (Fe complex), N-phenylanthranilic acid, N-Ethoxychrysoidine, 2,2'-Bipyridine (Fe complex), 5,6-Dimethylphenanthroline (Fe complex), ortho-dianisidine, sodium diphenylamine sulfonate, rare earth, cobalt salts, sulfate salts, and combinations thereof.

In one or more embodiments, the indicator may be a pH indicator and/or an indicator which changes color in the presence of an analyte, such as ammonia, sulfur derivatives, ethylene, amines, indole, escathol, acids (e.g., lactic acid, gluconic acid, or acetic acid) and combinations thereof. In some embodiments, indicators may also produce a color change upon exposure to humidity, temperature, after the passage of time, a change in organic volatile concentration, or a change in oxygen concentration. It is also envisioned that multiple indicators may be included in a polymer composition, where each indicator is sensitive to a different stimulus.

Intelligent polymer compositions may contain an indicator at a percent by weight (wt %) that ranges from amount varying from a lower limit selected from one of 0.1, 0.5, and 20 wt %, to an upper limit selected from one of 5, 15, and 65 wt %, where any lower limit may be paired with any upper limit. However, more or less indicator may be added depending on the particular application.

Encapsulant

Indicators in accordance with the present disclosure may optionally be encapsulated by a encapsulant that prevents the indicator from leaching out of the polymer composition, but allows diffusion of substances into the encapsulated indicator that trigger a color change. The encapsulant the present disclosure, by its intrinsic characteristics, may allow contact between an analyte and the indicator and, on the other hand, substantially inhibit the release of the indicator to the medium. In other words, the encapsulant protects the indicator, substantially avoiding or minimizing its leaching into the external environment.

The porous matrix in which the indicator is encapsulated may be an organic, inorganic or hybrid matrix. In one or more embodiments, indicators may be encapsulated by the reaction of an encapsulant precursor such as silicon alkoxides or titanium alkoxides, which react to form a matrix that modifies the rate at which the indicator may leach into the surrounding polymer or environment. In some embodiments, encapsulants may be prepared according to a sol-gel method, such as that described in U.S. Pat. No. 9,063,111. In some embodiments, alkoxide substituents of the encapsulant precursors may include C1-C12 alcohols, which may be linear or branched and may be substituted with various functional groups such as vinyl groups, alkyls, amines, amides, imines, carboxylates, and alcohols.

The encapsulant in which the indicator is encapsulated may be an organic, inorganic or hybrid matrix. In one or more embodiments, the encapsulant may be a silica matrix. Indicators may be encapsulated by a matrix formed by the reaction of an encapsulant precursor such as silicon alkoxides or titanium alkoxides in some embodiments, or mixtures of silicone alkoxides and titanium alkoxides in other embodiments, which react to form a matrix that modifies the rate at which the indicator may leach into the surrounding polymer or environment and also protects the indicator from substantial degradation due to the polymer processing conditions. In some embodiments, encapsulants may be prepared according to a sol-gel method, such as that described in U.S. Pat. No. 9,063,111, but not limited to the precursors described therein. In some embodiments, alkoxide substituents of the encapsulant precursors may include C1-C12 alcohols, which may be linear or branched and may be substituted with various functional groups such as vinyl groups, alkyls, amines, amides, imines, carboxylates, and alcohols.

In one or more embodiments, the indicator may be added relative to the same weight of encapsulant precursor that may have a mole percent (mol %) that varies from 0.001 mol % to 10 mol % of indicator per mol of encapsulant precursor. Intelligent polymer compositions in accordance may contain a concentration of indicator or encapsulated indicator at a percent by weight (wt %) of the polymer concentration that ranges from 0.005 to 40 wt % in some embodiments, and from 0.01 to 30 wt % in some embodiments.

Other components present in the polymer compositions in accordance with the present disclosure may include functional additives including compatibilizers, stabilizers such as distearyl pentaerythritol phosphite; metal compounds such as zinc 2-ethylhexanoate; epoxy compounds such as epoxidized soybean oil and epoxidized linseed oil; nitrogen compounds such as melamine; phosphorus compounds such as tris(nonylphenyl)phosphite; UV absorbers such as benzophenone compounds and benzotriazole compounds; antioxidants; silicone oils; fillers such as clay, kaolin, talc, hydrotalcite, mica, zeolite, perlite, diatomaceous earth, calcium carbonate, glass (beads or fibers), and wood flour; foaming agents; foaming aids; crosslinking agents; crosslinking accelerators; flame retardants; dispersants; and processing aids such as resin additives. Other additives may include plasticizers, acid scavengers, antimicrobials, antioxidants, flame retardants, light stabilizers, antistatic agents, colorants, pigments, perfumes, chlorine scavengers, and the like.

Synthesis

Intelligent polymer compositions in accordance with the present disclosure may be prepared by extrusion using standard extrusion processes for processing polyolefins, such as temperature profile, extrusion including screw-type extrusion, and mixers such as Haake mixing chambers under standard processing conditions and temperature profile for polyolefins.

In one or more embodiments, polymer components may be combined in a single step or as a series of combination steps. For example, a subset of intelligent polymer composition components may be combined concurrently or separately in an extruder as a masterbatch or a final composition. It is also envisioned, for example, that all components by the matrix polymer may be added together, with the matrix polymer subsequently being added.

Applications

Intelligent polymer compositions in accordance with the present disclosure may be prepared by a varied number of techniques, including solution cast, blown film extrusion, thermoforming, injection molding, injection-blow molding, extrusion, blow molding, rotomolding, pultrusion, compression molding, coextrusion, and lamination.

In one or more embodiments, intelligent polymer compositions may be applied in various forms of food packaging to communicate particular qualities of the food through color change in response to stimuli. In some embodiments, the stimuli may be pH changes induced by spoilage organisms, which induce a color change indicating to a consumer the presence of food degradation.

Intelligent polymer compositions in accordance with the present disclosure may be used in part or in whole of rigid and flexible containers, films, sheets, bottles, cups, containers, pouches, bottles, caps, labels, among others, as well as molded articles such as pipes, tanks, drums, water tanks, household appliances, geomembranes, silo bags, housewares, mulching, and personal protective gear such as air filters and gas masks. Intelligent polymer compositions may also be used in leak detecting devices, such as those installed on gas and liquid pipelines.

EXAMPLES

The following examples are merely illustrative, and should not be construed as limiting the scope of the present disclosure.

1) Preparing an Encapsulated Intelligent Additive

In a first example, an encapsulated indicator in accordance with the present disclosure was produced according to the following steps:

a) Preparation of a Mixture of Sol-Gel Precursor

A solvent is selected that is suitable as a reactive medium for a sol-gel reaction. The pH of the solvent is adjusted by the addition of an inorganic or organic acid or base. A sol-gel precursor is used, such as silicon alkoxide or titanium alkoxide, is then added to the solvent to initiate the formation of the porous matrix.

b) Addition of the pH Indicator

In the next step, an indicator is added to the sol-gel reaction after a period of synthesis that may vary from 0.1 s to 24 h. In the examples, the pH indicator amount may vary from 0.0001 g to 10 g relative to the same weight of the sol-gel precursor. The intelligent additives are prepared by controlling the synthesis pH, sol-gel precursor/water ratio, sol-gel precursor/acid, or base ratio and the amount of pH indicator and choosing the appropriate sol-gel precursor.

c) Dry the Suspension Obtained from Steps a and b.

The encapsulated indicator is then obtained from the reaction solution and dried to powder form. The powder is then dispersed in a polymer matrix and tested to ensure color change occurs when exposed to the appropriate stimuli, a change in pH in this example.

1.1) Experimental Conditions of the Sol-Gel Reaction to Encapsulate the Indicator Example 1: Encapsulation of Bromothymol Blue The sol-gel reaction was conducted under acid catalysis. An example of synthesis begins with mixing 10 mL of tetraethylorthosilicate (TEOS) with 5 mL of 1.0M HCl and, after 7 h of synthesis, adding 0.01 mol % of bromothymol blue in relation to the number of moles of TEOS, or adding 0.0281 g of bromothymol blue. After 72 h of the start of the synthesis, the product obtained was ground and washed with 30 mL of ethanol 99.5% and heated to 70° C. for 16 h. The encapsulated indicator was obtained in powder form and exhibited a yellow coloration.

Example 2: Synthesis with Fast Green

The sol-gel reaction was conducted under acid catalysis. An example of synthesis begins by mixing 10 mL of tetraethylorthosilicate (TEOS) with 5 mL of 1.0M HCl and, after 7 h, adding 0.01 mol % of fast green relative to the number of moles of TEOS, or adding 0.0345 g of fast green. After 72 h, the product was obtained, ground, and washed with 30 mL of 99.5% ethanol, and then heated to 70° C. for 16 h. The encapsulated indicator was obtained as a dried powder with a green coloration.

Example 3: Synthesis with Mixture of Indicators—Bromothymol Blue and Methyl Red

The sol-gel reaction was conducted under acid catalysis. In this example, 10 mL of tetraethylorthosilicate (TEOS) was mixed with 5 mL of 1.0M HCl, and, after 7 h, adding 0.02 mol % of a mixture of bromothymol blue and methyl red (molar ratio 1:2) in relation to the number of moles of TEOS, or adding of 0.0125 g of bromothymol blue and 0.0108 g of methyl red. After 72 h, the product obtained was ground and washed with 30 mL of ethanol 99.5% and heated to 70° C. for 16 h. The encapsulated indicator was obtained as a dried powder with a green coloration.

1.2) Evaluation of the Color Change of the Indicator in Response to Stimulant

In order to verify the ability of the indicator to function within an intelligent composition in response to pH variation, the encapsulated indicator was subjected to a basic gas (ammonia). For the bromothymol blue indicator formulation, the indicator exhibited a yellow coloration initially, and after contact with ammonia vapors, exhibited a change to a blue color in response to the pH change under visual inspection.

2) Incorporation of the Intelligent Additive in the Polymeric Matrix

The incorporation of the encapsulated additive into a polymer matrix was performed using standard extrusion procedures for the processing of polyolefins, such as temperature profile, and extrusion such as screw-type extrusion. Samples can also be produced using a Haake mixing chamber, under standard processing conditions and temperature profile for polyolefins. After the incorporation of the encapsulated indicator into the intelligent polymer composition, bottle caps were made in an injector, and sample discs were made in a press, and bottles by blow molding.

Intelligent polymer compositions were formulated with various polymer components including low density polyethylene (LDPE), linear low density polyethylene (LLDPE), high density polyethylene (HDPE), and polypropylene (PP).

3) Following Color Reversibility

The color of the samples was evaluated and quantified before and after contact with an appropriate pH stimulant. The color reversibility was evaluated after removing the samples from contact with the stimulant. The color change was monitored periodically.

Color Change Quantification:

The color change of the polymers were evaluated visually and measured instrumentally with a (LabScan®XE from HunterLab) spectrophotometer in accordance with the principles discussed above with respect to Eq. (1).

Example 2: Intelligent Polymer with Linear Low Density Polyethylene Matrix (LLDPE) with Intelligent Additive Based on Bromothymol Blue Indicator

TABLE 1

Sample compositions assayed for Example 2

| Sample | 1 | 2 |
|---|---|---|
| LLDPE | 99% | 79% |
| SiO$_2$/BB (BB = bromothymol blue) | 1% | 1% |
| Ionomer | — | 20% |

Following formulation, color changes of the intelligent polymer compositions were verified upon exposure to basic stimulant ammonium hydroxide. Samples 1 and 2 exhibited a visible orange to blue shift characteristic of bromothymol blue upon exposure to ammonia vapors.

TABLE 2

Time to color change of the intelligent polymer compositions in Example 2

| Sample | Initial time | Final time |
|---|---|---|
| 1 | 33 min | 6 h 45 min |
| 2 | 35 min | 9 h |

In order to verify the color change properties of the intelligent polymer compositions, samples were subjected to basic vapors (ammonia). Polymer compositions formulated as described above were tested and exhibited color changes that corresponded to the respective pH indicator.

In the case of the additive containing the bromothymol blue indicator, the polymer produced is yellow. With exposure to ammonia vapors and consequent pH variation, a color change can be observed for blue in samples 1 and 2, confirming the thermal stability of indicator after being subjected to processing and injection temperatures.

Table 2 shows that the time for the color change, triggered by pH change, is dependent on the polymer composition of the intelligent polymer. This result proves that this system is promising for the development of intelligent packaging. Table 3 shows that the crystallization temperature (Tc) and melt temperature (Tm$_2$) remain similar to a control composition prepared from LLDPE as measured by differential scanning calorimetry.

TABLE 3

DSC results for polymer samples in comparison to a control polymer.

| Sample | Tc (° C.) | Tm$_2$ (° C.) | Cristallinity (286.18 J/g) (%) |
|---|---|---|---|
| LLDPE | 110.93 | 123.74 | 47.37 |
| Sample 1 | 110.17 | 125.12 | 46.00 |
| Sample 2 | 63.08 and 110.59 | 89.12 and 124.34 | 45.12 |

CIELAB Results for Reversibility:

To quantify the color variation of the intelligent polymers, before and after contact with basic vapors, the colorimetric analysis was carried out through a spectrophotometer. The method used was the CieLAB color system which consists of the following parameters that define the color: L*, a* and b*, where b*, varies from blue (negative values) to yellow (positive values).

In order to evaluate the color reversibility of the polymers after exposure to basic vapors, the colorimetric analysis of samples 1 and 2 was performed 6, 15, 20 and 34 days after ceasing contact with the basic vapors. With particular respect to Table 4, results for the b* values for Samples 1 and 2 are shown.

TABLE 4

CieLAB results for Samples 1 and 2 before and after exposure to ammonia vapor

|  | Sample 1 b* | Sample 2 b* |
|---|---|---|
| before exposure | 9 | 10 |
| 6 days | −1 | −2 |
| 15 days | 0.1 | 1.5 |
| 20 days | 1.7 | 1.0 |
| 34 days | 1.9 | 0.5 |

After contact with ammonia vapors, samples 1 and 2 initially presents negative values for parameter b* indicating a more bluish coloration. However, 34 days after the exposure to basic vapors, it presents positive values for parameter b* indicating a more yellowish coloration. These results indicate that the color in the composition having only the polyethylene and the encapsulated indicator (sample 1) is somewhat reversible.

Example 3: Intelligent Additive Based on Mixtures of Indicator in a Linear Low Density Polyethylene Matrix (LLDPE)

In the next example, samples formulations containing a mixture of indicators were prepared as shown in Table 5.

TABLE 5

Compositions for Example 3

| Component | Sample 3 | Sample 4 |
|---|---|---|
| LLDPE | 79% | 79% |
| Ionomer | 20% | 20% |
| SiO$_2$/FG MR (FG = fast green, MR = methyl red) | 1% | — |
| SiO$_2$/BB MR (BB = bromothymol blue, MR = methyl red) | — | 1% |

In order to verify the intelligent action of the encapsulated indicator incorporated in the polymer matrix, through the color change, polymer compositions were formed into plates that were then subjected to basic vapors (ammonia). The polymer incorporating the intelligent additive synthesized under the conditions described above exhibits the same color change as the respective intelligent additive.

In the case of the additive containing the mixture of fast green and methyl red indicators (sample 3), the polymer produced is purple. With exposure to ammonia vapors and, consequently, pH variation, it can be observed a color change for green. For the additive containing the mixture of blue bromothymol and methyl red indicators (sample 4), the polymer produced is red and after exposure to ammonia vapors the color changes to green. These results confirm the thermal stability of the material after being subjected to processing temperatures.

TABLE 6

Results of IF and DSC for Example 3

| Sample | Tc (° C.) | Tm$_2$ (° C.) | Cristallinity (286.18 J/g) |
|---|---|---|---|
| LLDPE | 110.93 | 124 | 47% |
| Sample 4 | 63 and 110 | 92 and 125 | 41% |

TABLE 7

Time to color change of the intelligent polymer, with indicator mixture, under basic vapors

| Sample | Initial time | Final Time |
|---|---|---|
| 3 | 1:20 h | 9:45 h |
| 4 | 2:25 h | 10 h |

Example 4: Intelligent Additive Include Indicator Mixture (Bromothymol Blue and Methyl Red) in High Density Polyethylene Matrix (HDPE)

Caps for 500 mL bottles were produced with high density polyethylene (HDPE) with incorporation of the intelligent additive include a mixture of indicators as Sample 6 containing 86.8% HDPE as the matrix polymer, 10% EVA as the adjunct polymer, 2.22% calcium stearate as a metal salt, and 1% of an SiO2 encapsulated dual indicator containing bromothymol blue and methyl red.

In order to verify the function of the indicator in the intelligent additive incorporated in the polymer matrix through the color change, parts of the injected caps of this composition were submitted to basic ammonia vapors. The polymer incorporating the porous matrix synthesized under the conditions described above exhibits the same color change as the respective intelligent additive.

In the case of the intelligent additive containing the mixtures of the indicators bromothymol blue and methyl red, the polymer produced is pink. With exposure to ammonia vapors and consequent pH variation, a color change for blue was be observed in the samples, confirming the thermal stability of the material after being subjected to processing and injection temperatures. Tables 8 and 9 show the time to color change and duration and results of IF and DSC testing for sample 5.

TABLE 8

Time to color change in response to ammonia vapor and duration of change

| Sample | Initial time | Final time |
|---|---|---|
| 5 | 23 min | 8 h 45 min |

TABLE 9

Results of IF and DSC for Sample 6

| Sample | MFI (g/10 min) | Tc (° C.) | Tm$_2$ (° C.) | Cristallinity % |
|---|---|---|---|---|
| HDPE (Matrix) | 2.00 | 117.7 | 130.4 | 73 |
| Sample 5 | 1.78 | 76 and 116 | 131 | 65.5 |

Example 5: Curcumin-Based Intelligent Additive (Natural Indicator) in Low Density Polyethylene (LLDPE)

In the next example, a curcumin (CUR) indicator was used in an intelligent polymer formulation as show in Table 10, without and with EVA, shown in samples 6 and 7, respectively. Following formulations polymers exhibited an initial yellow color that turned to orange upon exposure to ammonia vapor.

TABLE 10

Sample compositions for Example 5

| | Sample 6 | Sample 7 |
|---|---|---|
| LLDPE | 99% | 79% |
| EVA | — | 20% |
| SiO$_2$/CUR | 1% | 1% |

Curcumin is an indicator with low thermal stability and the encapsulation ensures the stability of this indicator maintaining its ability to change color even after processing with the polymer under conditions of high temperatures and shear.

Table 11 shows the time to color change and duration for Samples 6 and 7 following exposure to ammonia vapor.

TABLE 11

Time to color change in response to ammonia vapor and duration of change

| Sample | Initial time | Final time |
|---|---|---|
| 6 | 1 h 26 min | 6 h 30 min |
| 7 | 1 h 30 min | 7 h 20 min |

Example 6: Intelligent Polymer Based on HDPE

In the next example, intelligent polymer compositions were formulated as shown in Table 12, where composition is listed in wt % and the indicator is a silica-encapsulated bromothymol blue (BB).

TABLE 12

Polymer compositions for Example 7

| SAMPLE | HDPE | EVA | Ca Stearate | Indicator |
|---|---|---|---|---|
| A | 99% | — | — | 1% SiO$_2$/BB |
| B | 96.78% | — | 2.22% | 1% SiO$_2$/BB |
| C | — | 96.78% | 2.22% | 1% SiO$_2$/BB |
| D | 86.78% | 10% | 2.22% | 1% SiO$_2$/BB |
| E | 82.78% | 10% | 2.22% | 5% SiO$_2$/BB |

Following formulation, pellets of the sample formulations were compressed and molded in plates to evaluate the color change with an alkaline solution at a pH near 11.6.

Figure 1:
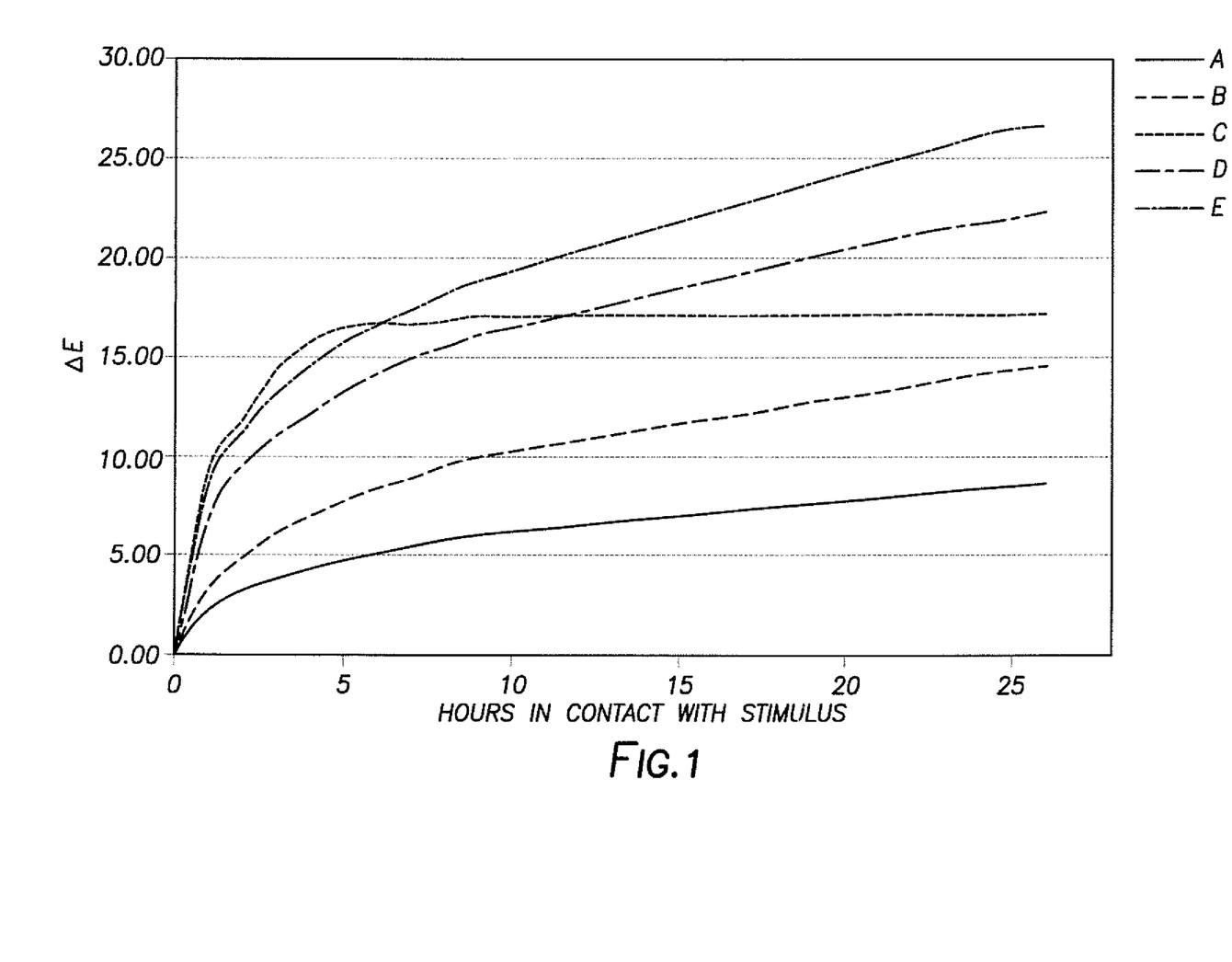
FIG. 1 is a graphical representation showing the $\Delta E$ change for a number of polymer compositions containing an intelligent additive as a function of hours in immersed in an alkaline solution in accordance with embodiments of the present disclosure.

The color change with the alkaline solution was measured by a spectrophotometer (LabScan®XE from HunterLab), hour by hour for the first 9 hours of contact with the solution, and then for 22 hours (not measured for sample E), 24 hours and 26 hours of contact with solution. FIG. 1 shows the ΔE of each sample calculated from the spectrophotometer data—the ΔE was calculated using the color before the contact with the alkaline solution as the initial color:

According to these data the addition of calcium stearate improves the color change of the polyethylene (Sample A compared with Sample B). Also, the addition of a polar polymer also improves the color change response and intensity (Sample B compared with Sample D) of the polyethylene. It is also noted that the addition of a higher amount of the indicator makes the color change response faster and more intense (Sample D compared with E).

In the case of using only a polar polymer with calcium stearate and the intelligent polymer composition (Sample C) exhibits a relatively fast response of approximately 2 hours.

Assuming a ΔE higher than 12 for a color change that is easily observed by eye, Sample C takes approx 2 hours to reach this level of ΔE, Sample D takes 4 hours, while Sample E takes approx. 2.5 hours to reach the same level of ΔE. Assuming a linear extrapolation between the points of 9 hours and 22 hours, Sample B may take about 16 hours, while it is unclear whether Sample A would reach this level in 26 hours. Individual Sample coordinates for Samples A-E are shown in Tables 13-17.

TABLE 13

Sample A CieLAB color change data

| Sample A | L* | a* | b* | ΔE |
|---|---|---|---|---|
| Before color change | 66.28 | −2.88 | 8.93 | — |
| After 01 hour in alkaline solution | 65.22 | −3.40 | 7.05 | 2.22 |
| After 02 hours in alkaline solution | 64.96 | −3.60 | 6.14 | 3.17 |
| After 03 hours in alkaline solution | 64.69 | −3.75 | 5.59 | 3.81 |
| After 04 hours in alkaline solution | 64.49 | −3.85 | 5.10 | 4.34 |
| After 05 hours in alkaline solution | 64.37 | −3.92 | 4.71 | 4.75 |
| After 06 hours in alkaline solution | 64.24 | −3.99 | 4.37 | 5.12 |
| After 07 hours in alkaline solution | 64.12 | −4.03 | 4.03 | 5.48 |
| After 08 hours in alkaline solution | 63.99 | −4.09 | 3.75 | 5.79 |
| After 09 hours in alkaline solution | 63.88 | −4.13 | 3.54 | 6.04 |
| After 22 hours in alkaline solution | 63.28 | −4.43 | 1.59 | 8.08 |
| After 24 hours in alkaline solution | 63.21 | −4.48 | 1.31 | 8.38 |
| After 26 hours in alkaline solution | 63.10 | −4.51 | 1.05 | 8.66 |

TABLE 14

Sample B CieLAB color change data

| Sample B | L* | a* | b* | ΔE |
|---|---|---|---|---|
| Before color change | 65.60 | −2.09 | 13.00 | — |
| After 01 hour in alkaline solution | 64.10 | −2.98 | 10.21 | 3.29 |
| After 02 hours in alkaline solution | 63.48 | −3.36 | 8.75 | 4.91 |
| After 03 hours in alkaline solution | 63.07 | −3.65 | 7.64 | 6.13 |
| After 04 hours in alkaline solution | 62.78 | −3.83 | 6.81 | 7.02 |
| After 05 hours in alkaline solution | 62.50 | −3.97 | 6.15 | 7.75 |
| After 06 hours in alkaline solution | 61.89 | −3.97 | 5.65 | 8.44 |
| After 07 hours in alkaline solution | 62.12 | −4.15 | 5.04 | 8.93 |
| After 08 hours in alkaline solution | 61.70 | −4.23 | 4.55 | 9.55 |
| After 09 hours in alkaline solution | 61.61 | −4.31 | 4.10 | 10.00 |
| After 22 hours in alkaline solution | 60.56 | −4.74 | 0.73 | 13.52 |
| After 24 hours in alkaline solution | 60.46 | −4.81 | 0.14 | 14.11 |
| After 26 hours in alkaline solution | 60.19 | −4.88 | −0.20 | 14.54 |

TABLE 15

Sample C CieLAB color change data

| Sample C | L* | a* | b* | ΔE |
|---|---|---|---|---|
| Before color change | 45.68 | −2.71 | 3.45 | — |
| After 01 hour in alkaline solution | 41.76 | −3.40 | −5.01 | 9.35 |
| After 02 hours in alkaline solution | 40.92 | −3.25 | −7.46 | 11.92 |
| After 03 hours in alkaline solution | 39.82 | −2.99 | −9.61 | 14.32 |
| After 04 hours in alkaline solution | 39.29 | −2.73 | −11.00 | 15.80 |
| After 05 hours in alkaline solution | 39.13 | −2.57 | −11.72 | 16.53 |
| After 06 hours in alkaline solution | 39.29 | −2.49 | −12.04 | 16.76 |
| After 07 hours in alkaline solution | 39.71 | −2.44 | −12.14 | 16.70 |
| After 08 hours in alkaline solution | 39.60 | −2.47 | −12.27 | 16.86 |
| After 09 hours in alkaline solution | 39.42 | −2.43 | −12.45 | 17.09 |
| After 22 hours in alkaline solution | 40.07 | −2.50 | −12.77 | 17.17 |
| After 24 hours in alkaline solution | 40.23 | −2.56 | −12.80 | 17.14 |
| After 26 hours in alkaline solution | 40.12 | −2.53 | −12.85 | 17.23 |

TABLE 16

Sample D CieLAB color change data

| Sample D | L* | a* | b* | ΔE |
|---|---|---|---|---|
| Before color change | 68.96 | −1.53 | 13.64 | — |
| After 01 hour in alkaline solution | 65.91 | −3.36 | 7.69 | 6.94 |
| After 02 hours in alkaline solution | 64.33 | −3.90 | 5.56 | 9.61 |
| After 03 hours in alkaline solution | 63.69 | −4.19 | 4.28 | 11.07 |
| After 04 hours in alkaline solution | 63.40 | −4.37 | 3.21 | 12.15 |
| After 05 hours in alkaline solution | 62.78 | −4.53 | 2.28 | 13.28 |
| After 06 hours in alkaline solution | 62.48 | −4.63 | 1.46 | 14.14 |
| After 07 hours in alkaline solution | 62.24 | −4.69 | 0.65 | 14.96 |
| After 08 hours in alkaline solution | 61.90 | −4.76 | 0.18 | 15.54 |
| After 09 hours in alkaline solution | 61.63 | −4.81 | −0.37 | 16.16 |
| After 22 hours in alkaline solution | 59.95 | −5.09 | −5.19 | 21.18 |
| After 24 hours in alkaline solution | 59.88 | −5.10 | −5.74 | 21.70 |
| After 26 hours in alkaline solution | 59.72 | −5.07 | −6.34 | 22.30 |

TABLE 17

Sample E CieLAB color change data

| Sample E | L* | a* | b* | ΔE |
|---|---|---|---|---|
| Before color change | 63.06 | −0.75 | 28.64 | — |
| After 01 hour in alkaline solution | 59.22 | −3.73 | 21.32 | 8.80 |
| After 02 hours in alkaline solution | 58.16 | −4.50 | 19.15 | 11.32 |
| After 03 hours in alkaline solution | 57.51 | −4.97 | 17.45 | 13.19 |
| After 04 hours in alkaline solution | 56.92 | −5.33 | 16.28 | 14.55 |
| After 05 hours in alkaline solution | 56.42 | −5.60 | 15.17 | 15.79 |
| After 06 hours in alkaline solution | 56.00 | −5.80 | 14.42 | 16.67 |
| After 07 hours in alkaline solution | 55.77 | −5.96 | 13.68 | 17.44 |
| After 08 hours in alkaline solution | 55.45 | −6.08 | 12.98 | 18.21 |
| After 09 hours in alkaline solution | 55.15 | −6.22 | 12.40 | 18.88 |
| After 24 hours in alkaline solution | 52.23 | −7.33 | 5.74 | 26.18 |
| After 26 hours in alkaline solution | 52.21 | −7.34 | 5.16 | 26.69 |

Figure 4:
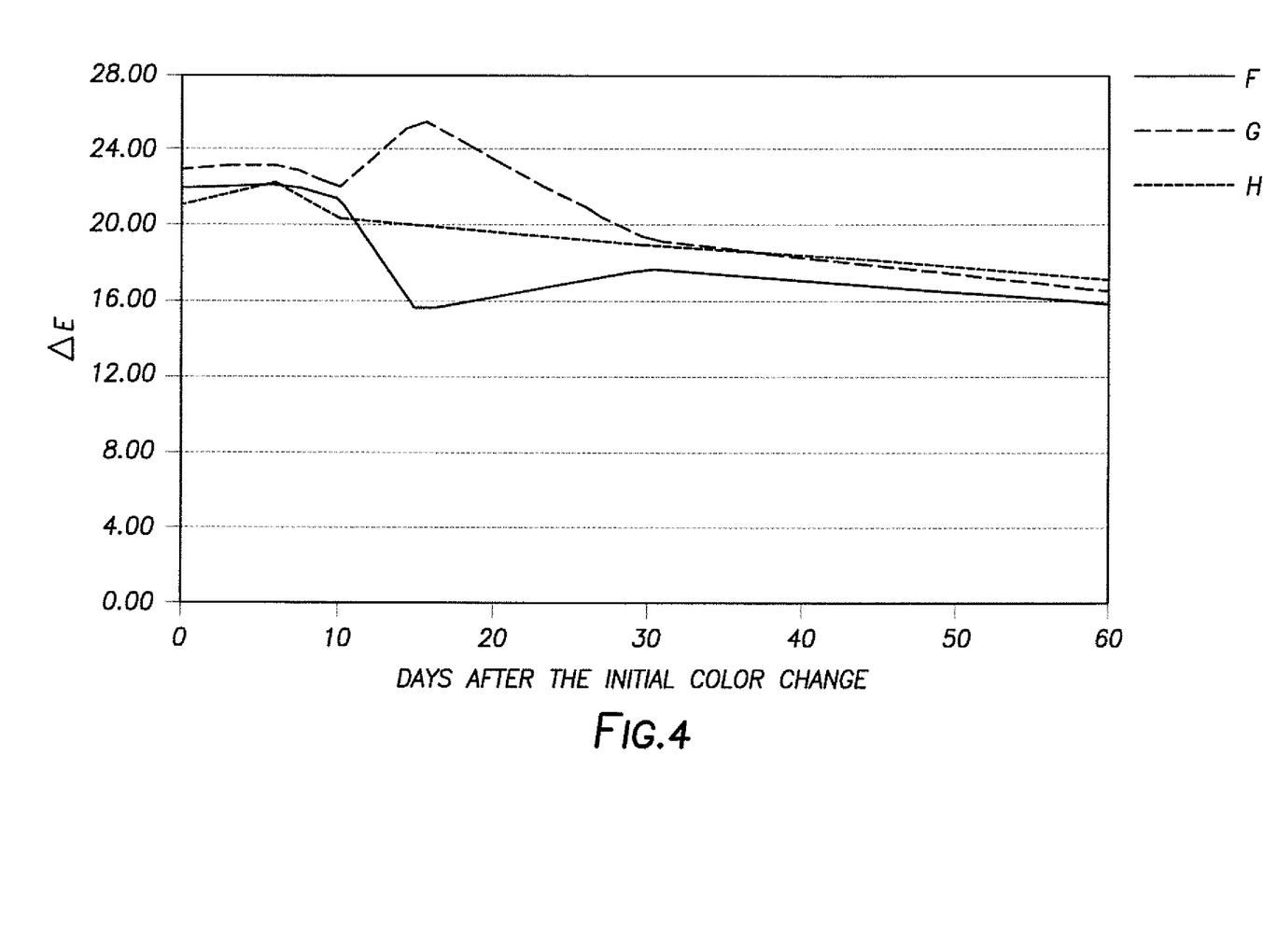
FIG. 4 is a graphical representation showing the $\Delta E$ change for a number of polymer compositions containing an intelligent additive as a function of days after the initial color change upon exposure to an alkaline solution in accordance with embodiments of the present disclosure.

To control the color change maintenance the color of the samples was measured by a spectrophotometer (LabScan®XE from HunterLab) for a certain period of time—05 days, 12 days, 20 days, 25 days (for a specific set of samples 26 days) and 32 days (for a specific set of samples 33 days) after the removal of the plates from the alkaline solution (or after the initial color change) (FIG. 4)

Figure 2:
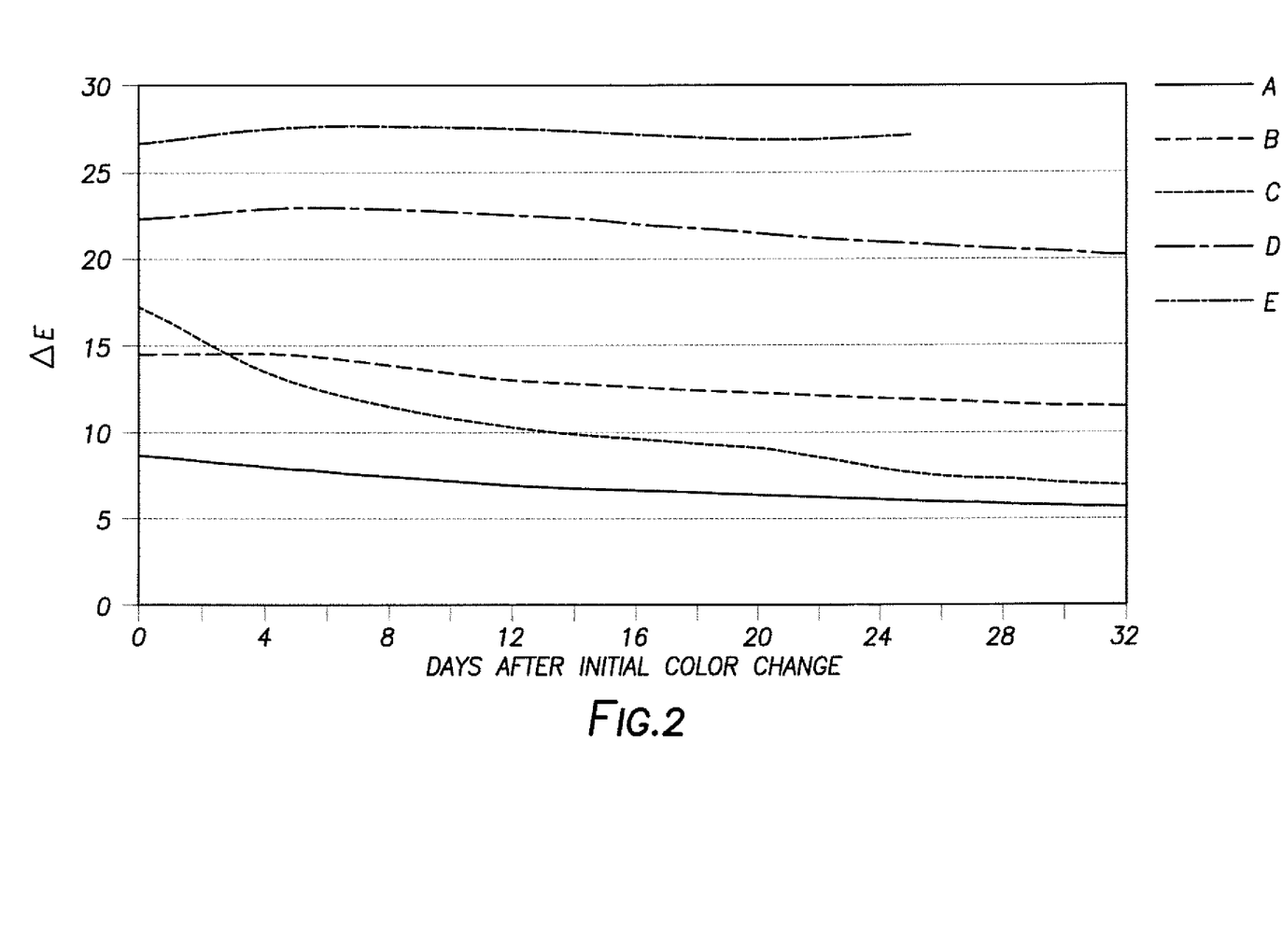
FIG. 2 is a graphical representation showing the $\Delta E$ change for a number of polymer compositions containing an intelligent additive as a function of days after the initial color change upon exposure to an alkaline solution in accordance with embodiments of the present disclosure.

With particular respect to FIG. 2, ΔE for a samples A-E are shown calculated from the spectrophotometer data gathered following initial color change in which the ΔE was calculated using the color before the contact with the alkaline solution as the initial color:

The data show that the color change is kept at least for 12 days (288 hours) for the Samples D and B due to small or not significant changes on ΔE values. On the other hand, there is a significant change on the ΔE of the sample C and after 12 days this value is less than 12 and therefore the color after this period is not undoubtedly differentiated from the initial color by human eyes.

TABLE 18

Sample A color change maintenance

| Sample A | L* | a* | b* | ΔE |
|---|---|---|---|---|
| Before color change | 66.28 | −2.88 | 8.93 | — |
| Immediately after color change | 63.10 | −4.51 | 1.05 | 8.66 |
| After 05 days of color change | 63.37 | −4.05 | 1.74 | 7.85 |
| After 12 days of color change | 63.80 | −3.93 | 2.53 | 6.95 |
| After 20 days of color change | 64.01 | −3.87 | 3.04 | 6.40 |
| After 25 days of color change | 64.17 | −3.87 | 3.36 | 6.04 |
| After 32 days of color change | 64.41 | −3.87 | 3.69 | 5.65 |

TABLE 19

Sample B color change maintenance

| Sample B | L* | a* | b* | ΔE |
|---|---|---|---|---|
| Before color change | 65.60 | −2.09 | 13.00 | — |
| Immediately after color change | 60.19 | −4.88 | −0.20 | 14.54 |
| After 05 days of color change | 60.14 | −4.28 | −0.20 | 14.45 |
| After 12 days of color change | 60.86 | −4.08 | 1.00 | 13.05 |
| After 20 days of color change | 61.24 | −4.00 | 1.67 | 12.29 |
| After 25 days of color change | 61.41 | −4.01 | 2.03 | 11.90 |
| After 32 days of color change | 61.61 | −4.02 | 2.44 | 11.45 |

TABLE 20

Sample C color change maintenance

| Sample C | L* | a* | b* | ΔE |
|---|---|---|---|---|
| Before color change | 4568 | −2.71 | 3.45 | — |
| Immediately after color change | 40.12 | −2.53 | −12.85 | 17.23 |
| After 05 days of color change | 40.30 | −2.84 | −8.21 | 12.84 |
| After 12 days of color change | 41.20 | −3.23 | −5.80 | 10.29 |
| After 20 days of color change | 41.39 | −3.37 | −4.52 | 9.08 |
| After 25 days of color change | 42.48 | −3.44 | −3.55 | 7.74 |
| After 32 days of color change | 42.75 | −3.47 | −2.75 | 6.91 |

TABLE 21

Sample D co or change maintenance

| Sample D | L* | a* | b* | ΔE |
|---|---|---|---|---|
| Before color change | 68.96 | −1.53 | 13.64 | — |
| Immediately after color change | 59.72 | −5.07 | −6.34 | 22.30 |
| After 05 days of color change | 59.30 | −4.16 | −7.04 | 22.98 |
| After 12 days of color change | 59.18 | −4.24 | −6.51 | 22.57 |
| After 20 days of color change | 59.92 | −4.33 | −5.61 | 21.45 |
| After 25 days of color change | 60.09 | −4.41 | −5.06 | 20.90 |
| After 32 days of color change | 60.39 | −4.47 | −4.39 | 20.19 |

TABLE 22

Sample E color change maintenance

| Sample E | L* | a* | b* | ΔE |
|---|---|---|---|---|
| Before color change | 63.06 | −0.75 | 28.64 | — |
| Immediately after color change | 52.21 | −7.34 | 5.16 | 26.69 |
| After 05 days of color change | 51.40 | −6.28 | 4.25 | 27.59 |
| After 12 days of color change | 51.33 | −6.10 | 4.34 | 27.51 |
| After 20 days of color change | 51.50 | −6.05 | 4.96 | 26.88 |
| After 26 days of color change | 51.45 | −6.08 | 4.69 | 27.15 |
| After 33 days of color change | 51.87 | −6.08 | 5.66 | 26.12 |

Example 7: Comparison of Functionalized and Non-Functionalized Encapsulated Indicator in HDPE Formulations In the following example indicators were encapsulated and comparisons were assayed between non-functionalized encapsulated indicators and those that were functionalized with various silane-based agents.

The syntheses consisted of mixing 9 mL of TEOS with 1 mL of silane and 5 mL of 1M HCl. After 7 h, 28 mg of bromothymol blue was added. After 3 days of the beginning of the synthesis, the product was ground baked at 70° C. for 50 min. Then the product was isolated and washed with ethanol.

Figure 3:
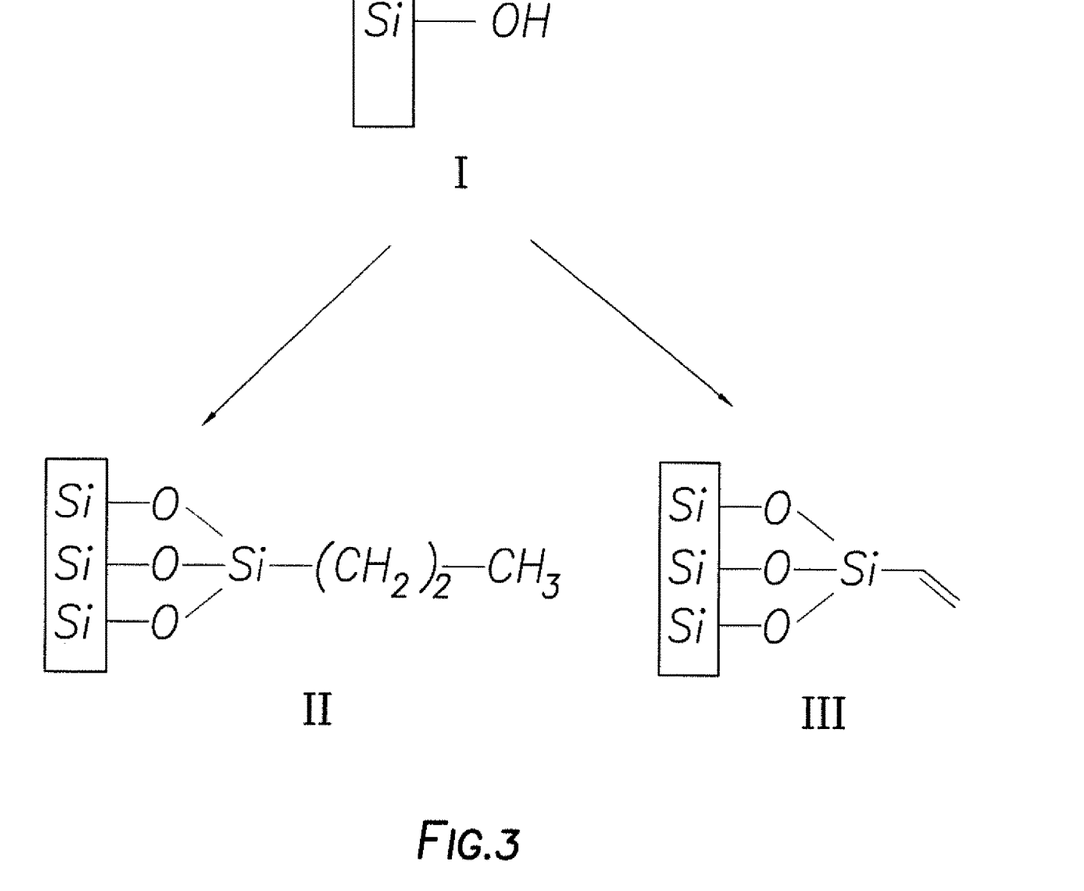
FIG. 3 is a diagram depicting the functionalization of silica-based encapsulants in accordance with embodiments of the present disclosure.

Some possible examples of functionalization agents in this example are n-propyltriethoxy silane (C3) and 97% vinyltriethoxy silane (Vy). With particular respect to FIG. 3, a schematic showing the functionalization of a silicate encapsulant surface with a silane reagent. For example, a silicate encapsulant (I) containing an embedded indicator may be modified with n-propyltriethoxy silane (C3) to produce structure (II) or modified with 97% vinyltriethoxy silane (Vy) to produce structure (III)

After the synthesis of the intelligent additive the polymer composition was prepared by extrusion process as discussed above. Samples in this example are formulated with HDPE, 10% EVA, 1% calcium stearate, and 1% of encapsulated indicator with a particular functionalization. Samples are denoted as follows: Sample F—Vy functionalized encapsulated indicator; Sample G: C3 functionalized encapsulated indicator; and Sample H—encapsulated indicator (Control sample).

Samples were formulated and combined with an alkaline solution. After contact with alkaline solution, the samples changed color from yellow to blue. The color change with the alkaline solution was measured by a spectrophotometer (LabScan®XE from HunterLab), hour by hour for the first 9 hours of contact with the solution, and then for 22 hours, 24 hours and 26 hours of contact with solution. With particular respect to FIG. 4, the color change over time after exposition of alkaline solution is shown. FIG. 4 shows the ΔE of each sample calculated from the spectrophotometer data—the ΔE was calculated using the color before the contact with the alkaline solution as the initial color.

Tables 23-25 show that capsules with functionalization and non-functionalized capsules combined with polyolefins, polar polymer and calcium stearate change color in contact with alkaline solution and keep the color change for longer time (minimal 60 days).

TABLE 23

CieLAB data of Sample F

| Sample F | L* | a* | b* | ΔE |
|---|---|---|---|---|
| Before color change | 69.10 | −3.17 | 13.83 | — |
| Immediately after color change | 61.05 | −7.25 | −6.11 | 21.89 |
| After 06 days of color change | 61.00 | −5.51 | −6.58 | 22.09 |
| After 10 days of color change | 61.35 | −5.50 | −5.84 | 21.28 |
| After 15 days of color change | 63.06 | −5.51 | −0.17 | 15.43 |
| After 30 days of color change | 62.95 | −5.40 | −2.57 | 17.66 |
| After 60 days of color change | 63.75 | −5.36 | −0.87 | 15.80 |

TABLE 24

CieLAB data of Sample G

| Sample G | L* | a* | b* | ΔE |
|---|---|---|---|---|
| Before color change | 68.85 | −3.10 | 15.75 | — |
| Immediately after color change | 60.65 | −6.96 | −5.26 | 22.88 |
| After 06 days of color change | 60.38 | −5.50 | −5.62 | 23.11 |
| After 10 days of color change | 60.92 | −5.43 | −4.56 | 21.93 |
| After 15 days of color change | 61.70 | −5.44 | −8.60 | 25.48 |
| After 30 days of color change | 61.89 | −5.52 | −1.92 | 19.14 |
| After 60 days of color change | 63.05 | −5.38 | 0.50 | 16.47 |

TABLE 25

CieLAB data of Sample H

| Sample H | L* | a* | b* | ΔE |
|---|---|---|---|---|
| Before color change | 67.48 | −3.96 | 10.71 | — |
| Immediately after color change | 60.31 | −7.95 | −8.74 | 21.11 |
| After 06 days of color change | 60.17 | −5.38 | −10.30 | 22.29 |
| After 10 days of color change | 70.78 | 0.14 | −8.98 | 20.38 |
| After 15 days of color change | 71.21 | 0.28 | −8.42 | 19.94 |
| After 30 days of color change | 61.47 | −5.64 | −7.29 | 19.06 |
| After 60 days of color change | 62.03 | −5.72 | −5.50 | 17.19 |

Example 8: Migration Evaluation of Indicator from Polymer Matrix

Figure 5:
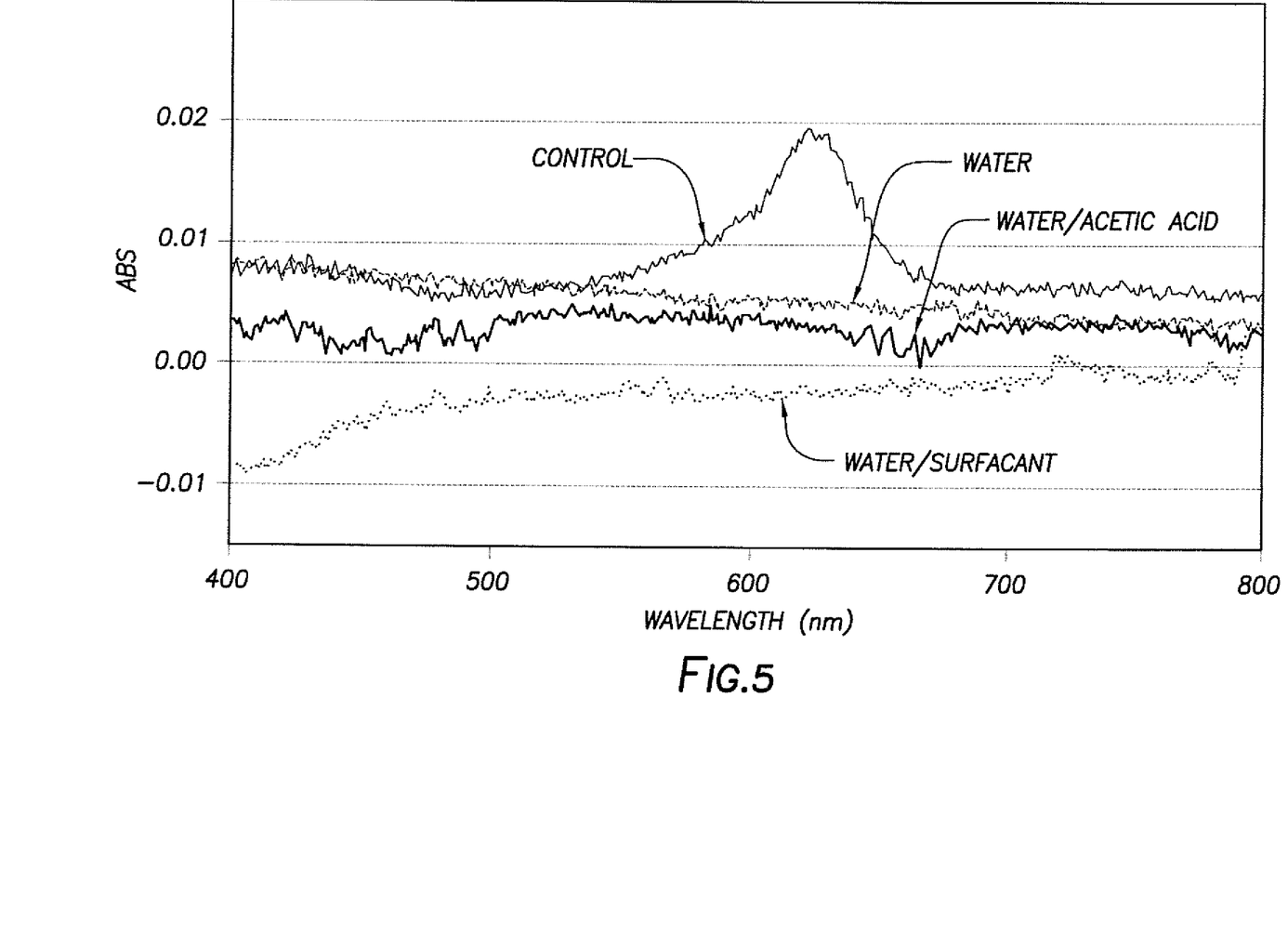
FIG. 5 is a graphical representation of ultraviolet-visible spectra showing the absorbance as a function of wavelength for a number of polymer compositions in accordance with embodiments of the present disclosure.

The leaching of the fast green indicator encapsulated in the matrix was evaluated by UV spectroscopy. With particular respect to FIG. 5, UV spectra are shown indicating the amount of fast green released by the intelligent polymers containing the intelligent additives when immersed in aqueous solutions for 14 days. It was observed that the amount released after 14 days does not exceed a concentration of $10^{-8}$ mol $L^{-1}$ or generate a similar signal exhibited by a control standard ("Control") having a concentration of 0.05× $10^{-6}$ mol/L. The intelligent polymer containing the encapsulated fast green indicator was also evaluated. This intelligent polymer was immersed in water ("Water") and aqueous solutions of acetic acid ("Water/acetic acid") and neutral surfactant Tween (Water/surfactant) for 14 days. It is observed in FIG. 5 that leaching of the fast green was not detected (limit of detection of this technique for this compound is in the concentration of $10^{-10}$ mol $L^{-1}$). These results indicate that the encapsulation process protects the indicator, avoiding its migration to the external environment.

Although the preceding description is described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

The invention claimed is:

1. A polymeric composition, comprising:
   one or more adjunct polymers selected from a group consisting of an ionomer and a polar polymer;
   an intelligent additive comprising an indicator sensitive to an external stimulus, wherein when exposed to the external stimulus, the intelligent additive triggers a color change in the polymeric composition, and
   a metal salt,
   wherein the composition reaches a ΔE of at least 12 in less than about 17 hours when in contact with the external stimulus.

2. The polymeric composition of claim 1, wherein the intelligent additive is present in a percent by weight that ranges from amount varying from 0.01 to 30 wt %.

3. The polymeric composition of claim 1, wherein the metal salt is present in a percent by weight that ranges from amount varying from 0.01 to 15 wt %.

4. The polymeric composition of claim 1, wherein the one or more adjunct polymers comprise one or more polar polymers present in a percent by weight that ranges from amount varying from 55 to 99.99 wt %.

5. The polymeric composition of claim 1, wherein the one or more adjunct polymers comprise one or more ionomers present in a percent by weight that ranges from amount varying from 55 to 99.99 wt %.

6. A polymeric composition, the composition comprising:
   a nonpolar matrix polymer;
   one or more adjuncts selected from the group consisting of an ionomer, a polar polymer, a metal salt, and combinations thereof; and
   an intelligent additive comprising an indicator sensitive to an external stimulus, wherein when exposed to the external stimulus, the intelligent additive triggers a color change in the polymer composition,
   wherein the composition reaches a ΔE of at least 12 in less than about 17 hours when in contact with the external stimulus.

7. The polymeric composition of claim 6, wherein the nonpolar matrix polymer is a polyolefin.

8. The polymeric composition of claim 6, wherein the nonpolar matrix polymer is present in a percent by weight that ranges from amount varying from 15 to 99.98 wt %.

9. The polymeric composition of claim 6, wherein the one or more adjuncts comprises one or more polar polymers present in a percent by weight that ranges from 1 to 30 wt %.

10. The polymeric composition of claim 6, wherein the one or more adjuncts comprises one or more ionomers present in a percent by weight that ranges from 1 to 85 wt %.

11. The polymeric composition of claim 6, wherein the one or more adjuncts comprises one or more metal salts present in a percent by weight that ranges from amount varying from 0.01 to 15 wt %.

12. The polymeric composition of any of claim 6, wherein the intelligent additive is present in a percent by weight that ranges from amount varying from 0.01 to 30 wt %.

13. The polymeric composition of claim 6, wherein, after at least 17 hours of exposure to the external stimulus, the composition exhibits a ΔE of at least 12 or more, maintaining ΔE of at least 12 or more for at least 5 days after the exposure to external stimulus is ceased.

14. A polymeric composition, the composition comprising:
- at least one polymer; and
- an intelligent additive comprising an indicator sensitive to an external stimulus, wherein when exposed to the external stimulus, the intelligent additive triggers a color change in the polymeric composition,
- wherein after at least 17 hours of exposure to the external stimulus, the polymer composition exhibits a ΔE of at least 8 or more, maintaining the ΔE of at least 8 or more for at least 5 days after the exposure to external stimulus is ceased.

15. The polymeric composition of claim 14, further comprising one or more adjuncts selected from of the group consisting of an ionomer, a polar polymer, a metal salt, and combinations thereof.

16. The polymeric composition of claim 14, wherein the at least one polymer comprises a polyolefin matrix polymer.

17. A polymeric composition, the composition comprising:
- at least one matrix polyolefin;
- one or more adjunct polymers;
- at least one metal salt; and
- an intelligent additive comprising an indicator sensitive to an external stimulus, wherein when exposed to the external stimulus, the intelligent additive triggers a color change in the polymeric composition,
- wherein after at least 17 hours of exposure to the external stimulus, the polymer composition exhibits a ΔE of at least 8 or more, maintaining the ΔE of at least 8 or more for at least 5 days after the exposure to external stimulus is ceased.

18. The polymeric composition of claim 17, wherein the external stimulus is selected form the group consisting of pH change, a humidity change, a temperature change, a passage of time, a change in organic volatile concentration, and a change in oxygen concentration.

19. The composition of claim 17, wherein the intelligent additive is encapsulated.

20. The composition of claim 19, wherein the indicator is encapsulated by an encapsulant prepared from the reaction of one or more selected from a group consisting of siliceous alkoxides and titanium alkoxides.

21. The composition of claim 19, wherein the indicator is encapsulated in a silica matrix.

22. The composition of claim 17, wherein the indicator sensitive to an external stimuli is one or more selected from a group consisting of methyl violet, crystal violet, ethyl violet, malachite green, 2-((p-(dimethylamino) phenyl) azo) pyridine, quinaldine red, para-methyl red, litmus, metanil yellow, 4-phenylazodiphenylamine, thymol blue, m-cresol purple, tropaeolin 00, 4-o-tolylazo-o-toluidine, erythrosine sodium salt, benzopurpurin 4b, n,n-dimethyl-p-(m-tolylazo) aniline, 2,4-dinitrophenol, methyl yellow (n, n-dimethyl-p-phenylazoaniline), 4,4'-bis(2-amino-1-naphthylazo)2,2'-stilbenedisulfonic acid, potassium salt of tetrabromophenolphthalein ethyl ester, bromophenol blue, congo red, methyl orange, methyl orange xylene cyanol solution, ethyl orange, 2-((p-(dimethylamino)phenyl)azo)pyridine, 4-(p-ethoxyphenylazo)-m-phenylenediamine, monohydrochloride, methyl red, lacmoid, bromocresol purple, bromothymol blue, phenol red, metacresol purple, thymol blue, phenolphthalein, thymolphthalein, alizarin yellow r, carmine of indigo, 2,5-dinitrophenol, bromocresol green, chlorophenol red, bromophenol red, neutral red, rosolic acid, cresol red, o-cresolphthalein, tropaeolin o, 4-nitrophenol, anthocyanins, ferroin, n-phenylanthranilic acid, resazurin, fast green, yellow twilight, bright blue, bordeaux, tartasin, red 40, erythrosine, anthocyanin, curcumin, cochineal carmine, saffron, azorubine, capsanthin, carmine hydro, indigotine, pinachrome, ponseau 4R, Resorcinmalein, rodol green, riboflavin, beet red, heptamethoxy red, hexametoxy red, propyl red, beta carotene, benzopyridine, mixture of cholesteryl oleyl carbonate, cholesteryl nonanoate, and cholesteryl benzoate, spironolactone, fluorans, spiropyrans, fulgides photochromic cyclic acid anhydrides of dialkylidenesuccinic acid, bisphenol A, parabens, 1,2,3-triazole derivates, 4-hydroxycoumarin, ferroin, methylene blue, N-phenanthranilic acid, resazurin, iron (II) complex 5-nitro-1,10-phenanthroline, 2,3-diphenylaminadicarboxylic acid, iron (II) complex 1,10-phenanthroline, iron (II) complex 5-methyl 1,10-phenanthroline, elioglacaine A, sulfonic acid diphenylamine, diphenylamine, p-ethoxychrysoidine, indigotetrasulfonate, phenosafranin, 2,2'-bipyridine (Ru complex), nitrophenantraline (Fe complex), N-phenylanthranilic acid, N-Ethoxychrysoidine, 2,2'-Bipyridine (Fe complex), 5,6-Dimethylphenanthroline (Fe complex), Ortho-Dianisidine, Sodium diphenylamine sulfonate, rare earth, cobalt salts and sulfate salts.

23. The composition of claim 17, wherein the intelligent additive is an encapsulated pH indicator.

24. The composition of claim 17, wherein the intelligent additive comprises a mixture of one or more pH indicators.

25. The composition of claim 17 wherein the one or more polar polymers comprises at least one functional group selected from a group consisting of hydroxyl, carboxyl and their salts, ester, ether, acetate, amide, amine, epoxy, imide, halides and combinations thereof.

26. The composition of claim 17, wherein the one or more polar polymers is selected from a group consisting of polyvinyl chloride (PVC), ethylene vinyl acetate copolymer (EVA), polyethylene terephthalate (PET), polyethylene grafted with maleic anhydride or its derivatives (PE-g-MA), polyethylene grafted with itaconic acid or its derivatives (PE-g-It), polypropylene grafted with maleic anhydride or its derivatives (PP-g-MA), and polypropylene grafted with itaconic acid or its dertivatives (PP-g-It).

27. The composition of claim 17 wherein the metal salt is an organic acid salt.

28. An article of manufacture prepared from the composition of claim 17.

* * * * *